(12) United States Patent
Heuer et al.

(10) Patent No.: US 6,905,242 B2
(45) Date of Patent: Jun. 14, 2005

(54) SENSOR TEMPERATURE CONTROL IN A THERMAL ANEMOMETER

(75) Inventors: Daniel A. Heuer, New Carlisle, IN (US); Fredrick W. Caspari, Michigan City, IN (US)

(73) Assignee: Dwyer Instruments, Inc., Michigan City, IN (US)

( * ) Notice: Subject to any disclaimer, the term of this patent is extended or adjusted under 35 U.S.C. 154(b) by 0 days.

(21) Appl. No.: 10/755,220

(22) Filed: Jan. 12, 2004

(65) Prior Publication Data

US 2004/0199354 A1 Oct. 7, 2004

Related U.S. Application Data

(60) Provisional application No. 60/440,475, filed on Jan. 16, 2003.

(51) Int. Cl.⁷ .............................. G01K 1/20; G01F 1/00
(52) U.S. Cl. ......................... 374/142; 73/202.5; 374/24
(58) Field of Search .............................. 374/24, 29, 39, 374/40, 45, 142, 143; 702/136; 73/204.17, 204.14, 204.22, 204.15, 202.5, 861

(56) References Cited

U.S. PATENT DOCUMENTS

| 2,314,877 A | * | 3/1943 | Hall ........................ 73/204.22 |
| 4,334,186 A | | 6/1982 | Sasayama et al. |
| 4,428,231 A | * | 1/1984 | Peloza ....................... 73/202.5 |
| 4,537,068 A | * | 8/1985 | Wrobel et al. ........... 73/861.02 |
| 4,581,930 A | * | 4/1986 | Komons ................... 73/204.17 |
| 4,860,583 A | * | 8/1989 | Olson ....................... 73/204.15 |
| 4,920,793 A | * | 5/1990 | Djorup .................... 73/170.12 |
| 4,936,144 A | * | 6/1990 | Djorup .................... 73/170.12 |
| 4,982,605 A | * | 1/1991 | Oram et al. ............. 73/204.19 |
| 5,069,066 A | * | 12/1991 | Djorup ................... 73/204.15 |
| 5,357,795 A | * | 10/1994 | Djorup .................... 73/170.12 |
| 5,654,507 A | * | 8/1997 | Hicks et al. ............. 73/204.14 |
| 6,411,192 B1 | * | 6/2002 | Landis ........................ 338/25 |
| 6,619,141 B2 | * | 9/2003 | Danninger ............... 73/861.63 |
| 6,639,506 B1 | * | 10/2003 | Landis ........................ 338/25 |
| 6,655,207 B1 | * | 12/2003 | Speldrich et al. .......... 73/202.5 |
| 2001/0004372 A1 | | 6/2001 | Engel |

FOREIGN PATENT DOCUMENTS

| EP | 374352 | 6/1990 |
| GB | 2077435 | 12/1981 |

* cited by examiner

*Primary Examiner*—Gail Verbitsky
(74) *Attorney, Agent, or Firm*—Barnes & Thornburg LLP

(57) ABSTRACT

A thermal anemometer that separates sensor heating from sensor temperature measurement through a switched sampling technique. This approach demonstrates several advantages over the more typical circuitry employing a bridge, which simultaneously heats the sensor and senses the ambient and velocity sensor temperature. In a thermal anemometer in accordance with the present invention, sensor temperature is determined by sampled measurement of its resistance. Sensor temperature is controlled by varying the voltage applied to the sensor with an error value determined by the difference between actual sensor resistance and the desired resistance.

19 Claims, 3 Drawing Sheets

SENSOR TEMPERATURE CONTROL IN A THERMAL ANEMOMETER

RELATED APPLICATIONS

This application claims the benefit of U.S. Provisional Application No. 60/440,475, filed Jan. 16, 2003.

FIELD OF THE INVENTION

This invention relates generally to thermal anemometers and in particular to a thermal anemometer implementation in which sensor heating and sensor temperature measurement are separated through a switched sampling technique.

BACKGROUND OF THE INVENTION

It is known that thermal anemometers belong to a class of instruments that sense mass flow using a heated sensor. The heat removed from the sensor can be related to the velocity of the air (or other fluid) moving past the sensor. This type of sensor has been used since the late 1800's with some of the earliest theoretical analysis done in the very early $20^{th}$ century. Thermal anemometry continues to be the subject of research, and has evolved to be one of the predominant methods of airflow measurement.

The principle used requires that the flow sensor be heated to some temperature above the temperature of the fluid or gas being measured. Velocity of the fluid or gas is related to the power dissipation in the sensor. Very early implementations of thermal anemometers involved manual adjustment of the sensor temperature. The manual adjustments proved to be inconvenient and, as technology became available, were replaced by electronic control circuitry that automatically maintained the sensor at the specified temperature.

It is instructive to examine a typical circuit known in the art, which is shown in FIG. 1. This circuit includes a bridge circuit 100, an operational amplifier 101, and a power output amplifier 102. The bridge circuit 100 comprises two circuit legs. The first leg senses the ambient temperature, and includes a resistive temperature detector (RTD) RD, an offset resistance RC, and a reference resistance RA. The second leg is the heated velocity sensor, comprising a second reference resistor RB and the heated RTD RE.

The circuit of FIG. 1 works by applying a voltage to the bridge 100 sufficient to heat the velocity sensor (RE) to a temperature where its resistance will balance the bridge 100. In this circuit, sensor measurement and temperature control occur simultaneously. Within this circuit, the resistive sensor RE behaves as a nonlinear passive element. The nonlinearity results from power dissipation in the sensor, which raises the sensor temperature and changes its resistance, thus making the resistance value dependent on the current through the sensor. Control of the sensor temperature takes advantage of this nonlinear behavior.

There are several limitations of this prior-art technique that must be considered. One such limitation is that the ambient temperature sensor must not be powered in any way that could cause self-heating, while the RTD (resistance temperature detector) used to sense the velocity must be heated sufficiently to sense airflow. Since these sensors are typically disposed in corresponding legs of a bridge network, only by making the ambient sensor resistance much larger than the velocity sensor resistance will the self-heating be reduced sufficiently to prevent significant temperature errors. This limits the selection of sensors and often requires the use of more expensive custom RTDs rather than lower cost standard values used widely in the industry. Additionally, with a very low sensor resistance, sensitivity to temperature is proportionally lower, requiring measurement of signals near the threshold of system noise.

Another limitation is the resistances in interconnection wiring and connectors. Practical use of the sensors often requires that the sensors be located some distance from the rest of the circuitry. The resistance of the wire and other connecting devices can be quite significant with respect to the resistance of the sensors, and causes potential temperature and measurement errors. Compensating for these parasitic resistances is usually done by varying the bridge component values or adding additional compensation circuitry. This can require a significant amount of calibration time and increase the cost of the system. Changes in the lead resistance due to temperature variations can cause temperature errors that are difficult to compensate.

In addition, sensor operating temperature may be restricted to a single offset value because of the fixed offset resistor generally employed in prior-art designs. In implementations where it is desirable to allow selection of different velocity ranges, varying the offset temperature allows the sensor sensitivity to be optimally adjusted.

Consequently, a need arises for a thermal anemometer system that avoids self-heating of the ambient temperature sensor, does not suffer from calibration errors due to interconnecting wiring, and operates easily at different velocity ranges, while retaining dependability and a relatively low cost/performance ratio.

SUMMARY OF THE INVENTION

These needs and others are satisfied by the thermal anemometer of the present invention, which separates the sensor heating from the sensor temperature measurement through a switched sampling technique. This approach has several advantages over the more typical circuitry employing a bridge circuit, which simultaneously heats the sensor and senses the ambient and velocity sensor temperature.

In a thermal anemometer, also known as a hot wire anemometer, a heated resistive sensor is maintained at an elevated temperature above the temperature of the fluid or gas being measured. The measurement of flow velocity is accomplished by relating the power dissipation in the sensor to mass flow and hence velocity of the medium. The present invention is directed, at least in part, toward controlling sensor temperature. First, the sensor temperature is determined by sampled measurement of its resistance. Second, the sensor temperature is controlled by varying the voltage applied to the sensor with an error value determined by the difference between actual sensor resistance and the desired resistance.

Further objects, features, and advantages of the present invention will become apparent from the following description and drawings.

DETAILED DESCRIPTION OF THE INVENTION

There is described herein a thermal anemometer that offers distinct advantages when compared to the prior art. Two different embodiments are described within the scope of this invention. The first provides a single differential temperature setpoint, while the second allows the differential temperature to be adjusted through the use of microprocessor computations or other similar means.

Figure 2:
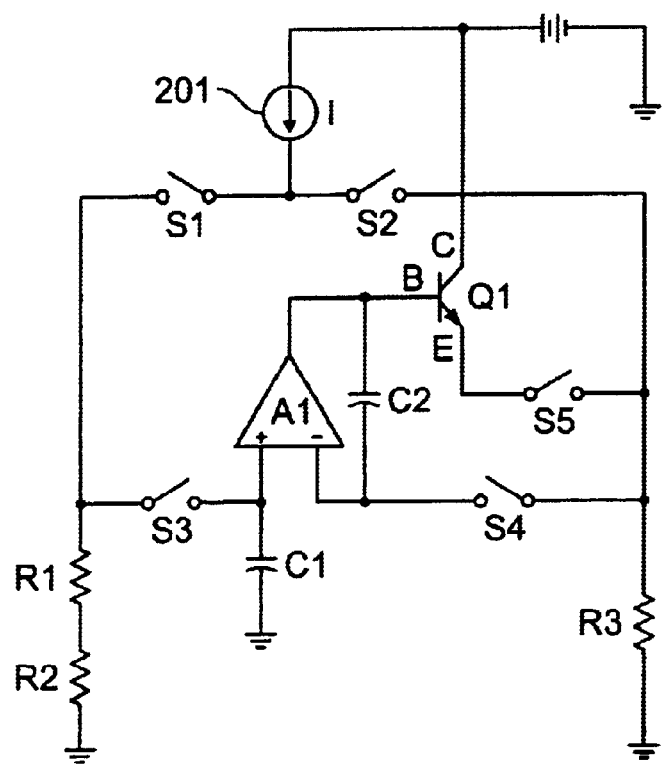
FIG. 2 is a simplified schematic diagram of a thermal anemometer in accordance with the present invention.

A thermal anemometer in accordance with the present invention is illustrated in FIG. 2. The circuit of FIG. 2 comprises a current source I 201 used to measure the resistance of the ambient sensor $R_2$ through switch $S_1$, and the velocity sensor $R_3$ through switch $S_2$. Switch $S_3$ and capacitor $C_1$ form a sample-and-hold circuit for the ambient measurement. Amplifier $A_1$ and capacitor $C_2$ form a combined error amplifier and sample-and-hold circuit. Switch $S_4$ controls the resistance sampling of the velocity RTD $R_3$, while switch $S_5$ and transistor $Q_1$ form the switched heating voltage driver. The combined error amplifier and sample-and-hold functions in $A_1$ and $C_2$ significantly reduce the complexity of this circuit over other implementations.

Figure 3:
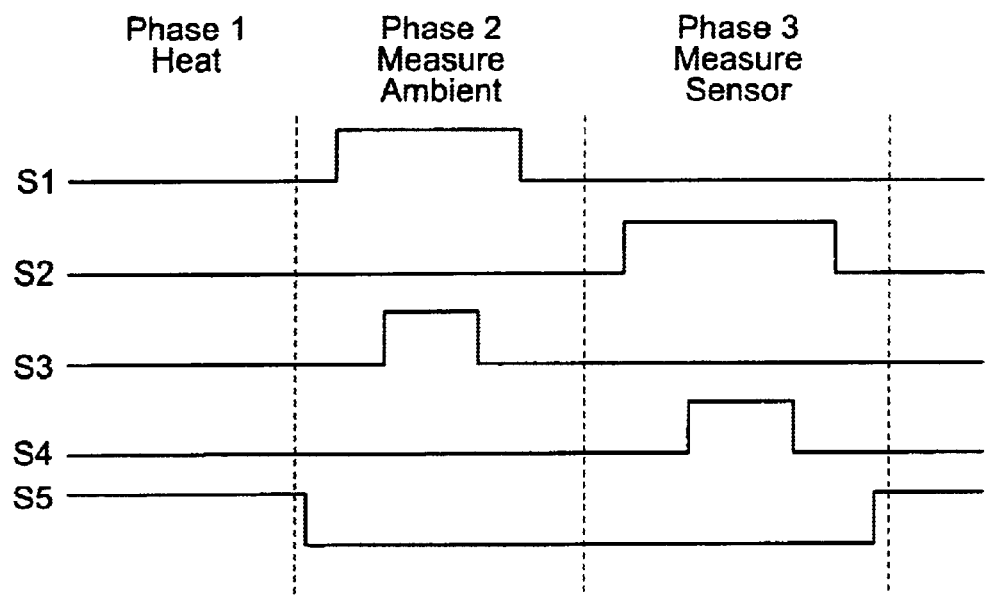
FIG. 3 is a timing diagram depicting switch operation in the circuit of FIG. 2.

The timing sequence for switch operation is illustrated in FIG. 3. It should be noted that a logic "1" or "HIGH" value in the diagram corresponds to a switch being closed. Circuit operation is properly divided into three phases. During PHASE 1, the velocity sensor ($R_3$ in FIG. 2) has a voltage applied that causes it to heat. In this PHASE, amplifier $A_1$ is connected to transistor $Q_1$ through switch $S_5$, as can be discerned from the HIGH level of the switch $S_5$ signal during PHASE 1. All other switches are OFF during PHASE 1. The controlled voltage applied to sensor $R_3$ maintains the sensor at the desired temperature by balancing the heat generated through power dissipation with the heat lost by the airflow past the sensor.

On a periodic basis, PHASE 2 and PHASE 3 are performed to correct differences between the setpoint temperature and the actual temperature of the velocity sensor $R_3$. PHASE 2 performs a measurement of the ambient temperature. PHASE 2 begins with the heating voltage disabled by opening switch $S_5$, as shown in FIG. 3. Switch $S_1$ is then closed to connect the current source I 201 to the resistor network comprising resistor $R_1$ and sensor $R_2$. Resistors $R_1$ and $R_2$ are chosen such that the voltage across them with current I is the desired voltage across $R_3$ with current I passing through it. After a stabilization time interval, switch $S_3$ is closed to transfer the voltage across $R_1$ and $R_2$ to capacitor $C_1$. PHASE 2 is effectively completed when switches $S_3$ and $S_1$ are opened.

PHASE 3 measures the resistance of the velocity sensor $R_3$, determines the difference between the desired setpoint temperature and the actual temperature, and then saves the new value as a voltage on capacitor $C_2$ that corrects the drive voltage. PHASE 3 begins with switch $S_5$ disabled (OFF), then switch $S_2$ is closed to allow current I to flow through velocity sensor $R_3$. This produces a voltage proportional to the resistance of $R_3$. When the circuit has stabilized, switch $S_4$ is closed to apply the voltage to the amplifier $A_1$. Amplifier $A_1$ detects the difference between the voltage on $R_3$ with respect to the voltage stored on $C_1$. This difference causes the amplifier $A_1$ to integrate this difference and store the integration value on capacitor $C_2$. At the completion of the cycle, switch $S_4$ is opened, then switch $S_2$ is opened, disconnecting the current source I 201 from the sensors. Switch $S_5$ is closed to allow the corrected drive voltage to be applied to the velocity sensor $R_3$. PHASE 1 is started again.

As with the traditional analog bridge circuit, the control of the sensor temperature takes advantage of its nonlinear behavior as a circuit element.

Velocity computation can be performed by measuring the voltage across the velocity sensor during the heating cycle and computing the power dissipation in the sensor. This power can be related to the velocity by a polynomial or other mathematical function derived and calibrated for the particular sensor.

There are several unique characteristics of this circuit. First, temperature measurement and heating are separated into distinctly separate time phases. Second, the use of a single current source for resistance measurement makes the operation of the circuit independent of the current source, since the circuit depends only on the ratio of the ambient and velocity resistance measurements. Third, amplifier $A_1$ and $C_2$ perform both error amplifier and sample-and-hold functions.

More particularly, the circuit of FIG. 2 provides several advantages over the typical bridge control circuit. In the first place, self-heating of the ambient temperature sensor $R_2$ is minimized by applying the excitation current I for very brief periods of time. In addition, using the same excitation current source eliminates differential errors between the ambient sensor and the velocity sensor.

Figure 1:
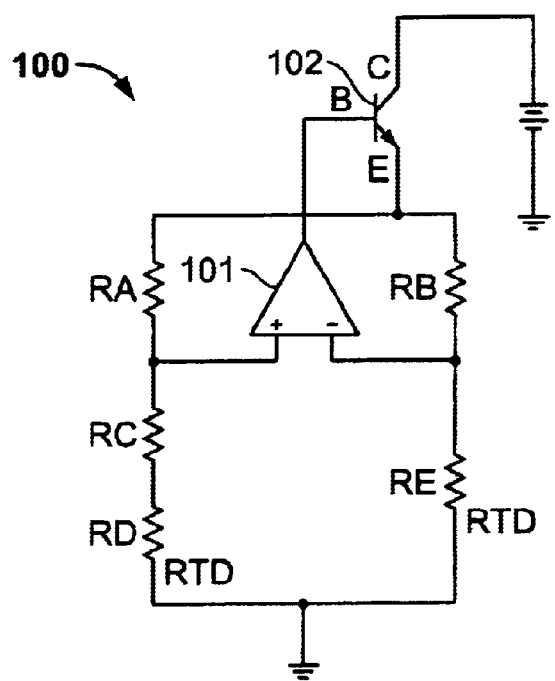
FIG. 1 is a simplified schematic diagram of a thermal anemometer of the prior art.

Furthermore, when RTD sensors $R_2$ and $R_3$ have the same characteristic resistance, resistance of the lead wires connecting the sensors $R_2$ and $R_3$ can be automatically corrected simply by making the lead length the same for both sensors. And, last of all, the circuit of FIG. 2 is self-starting. The bridge circuit of the prior art, as shown in FIG. 1, requires additional components to ensure the circuit starts properly when first powered.

In an alternative embodiment of the present invention, the ambient sensor $R_2$ and related circuit elements $R_1$, $S_1$, and $S_3$ (as shown in FIG. 2) are replaced by a microprocessor-controlled voltage source. The purpose of this approach is to allow the system to select different probe temperature differentials for different velocity ranges.

Figure 4:
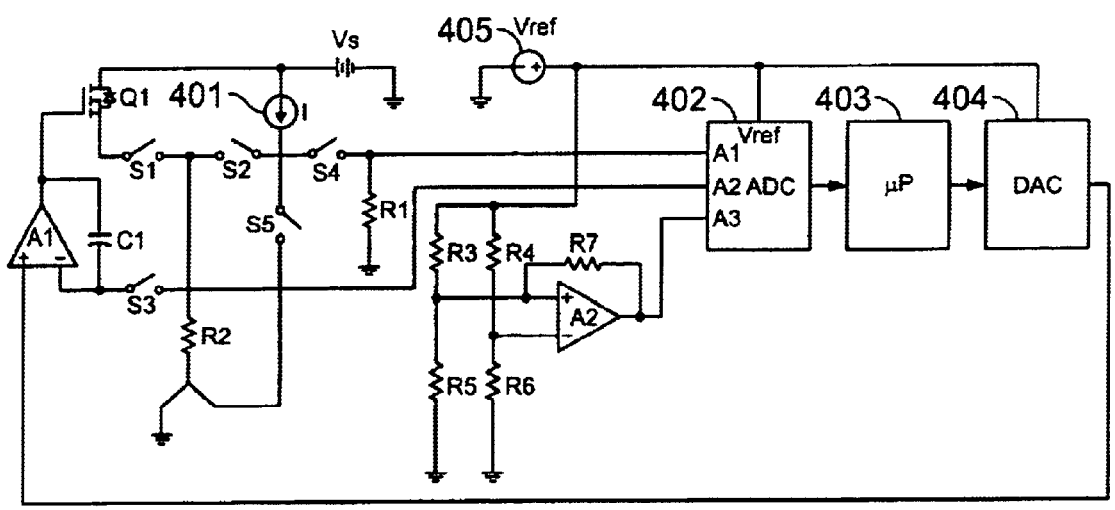
FIG. 4 is a simplified schematic diagram of an alternative embodiment of a thermal anemometer in accordance with the present invention.

Referring now to FIG. 4, current source I 401 provides a reference current upon which all resistance measurements are made. Switches $S_2$, $S_4$, and $S_5$ direct this current to different elements during the measurement cycle. Switch $S_1$ connects or disconnects the drive voltage to the velocity sensor $R_2$. Similar to the previous circuit, $S_3$, $C_1$ and $A_1$ form a combination sample-and-hold and integrating amplifier. $R_1$ provides a reference resistance. The network $R_3$, $R_4$, $R_5$, $R_6$, $R_7$ and $A_2$ measures the ambient temperature sensed by RTD $R_5$. An analog-to-digital converter (ADC) 402 measures the various voltage values present during the measurement cycle. In the preferred form of the invention, the ADC 402 is implemented as a TLV2544 analog-to-digital converter manufactured by Texas Instruments Incorporated of Dallas, Tex. Of course, many other suitable ADCs meeting similar specifications would also function adequately.

A microprocessor ($\mu$P) 403 provides all control and computation resources for the system. Preferably, the microprocessor 403 is a PIC16F76 microprocessor, manufactured by Microchip Technology Inc. of Chandler, Ariz. Of course, there are many other microprocessors, obtainable through various manufacturers, that would function equally well in this application. A digital-to-analog converter (DAC) 404 is programmed to produce a voltage relating the ambient temperature and required differential temperature to the resistance of the velocity sensor $R_2$. In the preferred embodiment of the invention, the DAC 404 is included within the microprocessor 403 as a PWM (pulse-width modulation) DAC, but the DAC may be implemented just as well as a separate component using a number of available DAC technologies.

Figure 5:
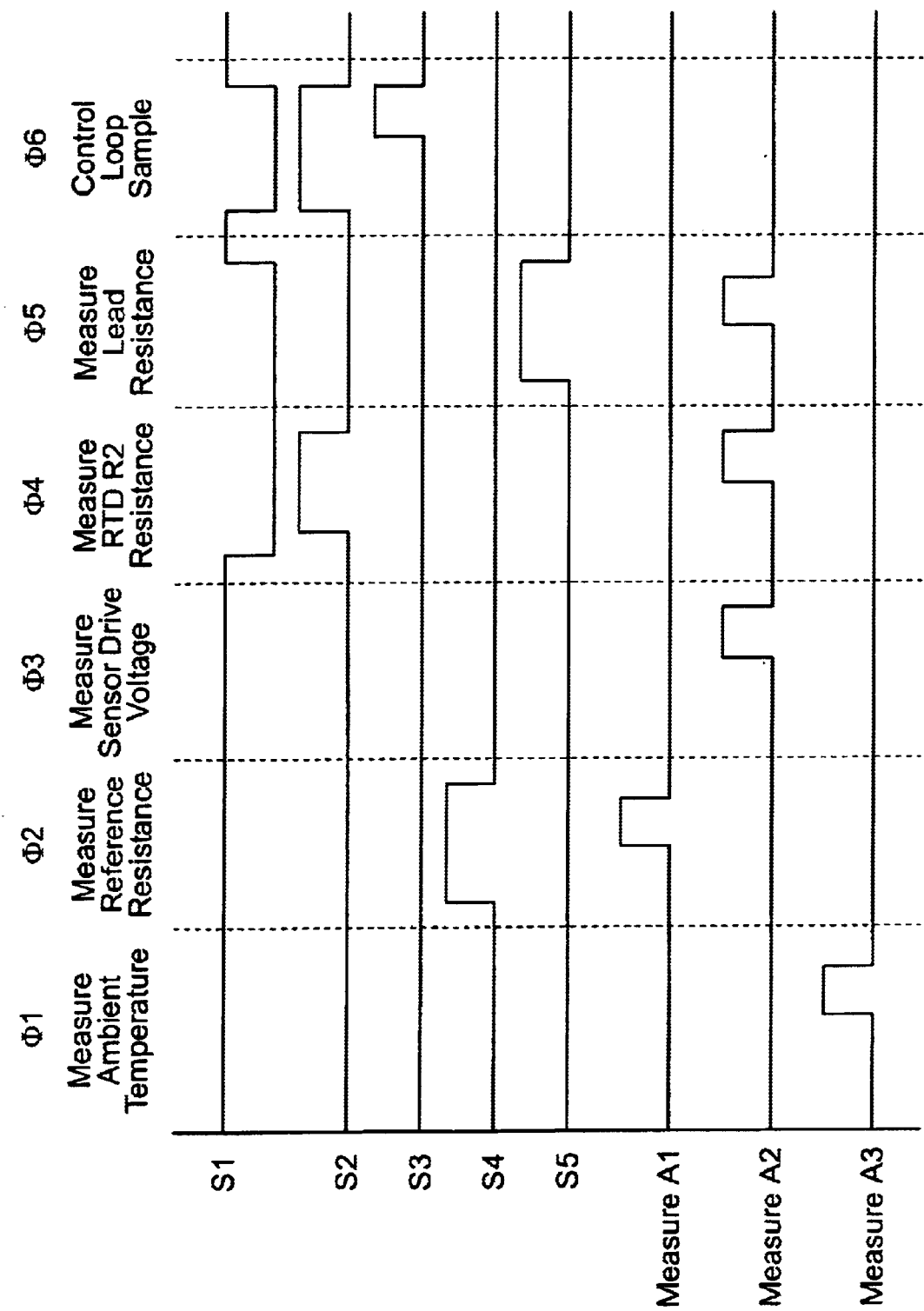
FIG. 5 is a timing diagram illustrating the measurement and control timing for the circuit of FIG. 4.

The measurement and control timing is illustrated in FIG. 5. Note that a logic "1" or "HIGH" value in the diagram of FIG. 5 corresponds to a switch being closed or a measurement being actively taken. The measurement cycle is divided into six measurement phases, $\Phi_1$ through $\Phi_6$ PHASE $\Phi_1$ measures the ambient temperature. PHASE $\Phi_2$ measures the reference resistance $R_1$. PHASE $\Phi_3$ measures the sensor drive voltage. PHASE $\Phi_4$ measures the velocity sensor $R_2$ resistance. PHASE $\Phi_5$ measures the lead resistance for $R_2$, while PHASE $\Phi_6$ performs a control loop sample to control the power dissipation in sensor $R_2$. Operation in the various phases is described in detail below.

The measurement and control process is designed to maintain the temperature of sensor $R_2$ such that the $R_2$ temperature remains a fixed differential temperature above the ambient temperature. This process begins by measuring the ambient temperature sensed by RTD $R_5$. The sub-circuit of FIG. 4 including RTD $R_5$ and the resistance network $R_3$, $R_4$, $R_6$, and $R_7$ connected to amplifier $A_2$ produces a voltage related to the ambient temperature. The microprocessor 403 computes the ambient temperature from the measurement of this voltage. The differential temperature is known from the velocity range selected for measurement. The desired velocity sensor temperature, or target temperature, is computed by summing the ambient temperature with the differential temperature. From this, the desired target resistance of the velocity sensor $R_2$ is computed.

An important element of the measurement process disclosed herein is the inclusion of a known reference resistance $R_1$. In PHASE $\Phi_2$, the current I is directed through $R_1$ via switch $S_4$. The measured voltage relates the current source I 401 and the known resistance $R_1$. Using this reference resistance allows the computation of resistance measurements to be related to the ratio of measured voltages and the known resistance value. The following equations demonstrate this:

$$R_{lead} = \frac{R_1 V_{lead}}{V_{R1}}$$

$$R_2 = \frac{R_1 (V_{R2} - V_{lead})}{V_{R1}}$$

Reference resistance $R_1$ is known a priori from the value selected during design. As can be seen, the resistance measurements are determined from the ratios of measured voltages and the known value of $R_1$. Since the voltage measurements are all related to the ADC reference voltage 405, the accuracy of the resistance measurement is constrained only by the absolute accuracy of the reference resistor $R_1$ and the resolution of the ADC 402. It can also be appreciated that the resistance measurements in accordance with the inventive system are independent of the current source I 401.

The resistance set point produced by the DAC 404 requires the inclusion of the lead resistance, which is measured in PHASE $\Phi_5$ and computed as described above. As is depicted in FIG. 4, the same reference voltage 405 used by the ADC 402 is also used by the DAC 404 which can be used to make the measurement and output processes completely ratiometric, eliminating many potential errors. Using these relationships, the DAC code can be computed by the following relationship:

$$C_{DAC} = \frac{K V_{R1} (R_{2\_tgt} + R_{Lead})}{R_1 V_{ref}}$$

Where $C_{DAC}$ is the code sent to the DAC 404, K is the DAC scaling constant, $V_{R1}$ is the voltage value measured for $R_1$, $R_1$ is the value of the reference resistor, $V_{ref}$ is the reference voltage 405 for the ADC 402 and DAC 404, $R_{2\_tgt}$ is the velocity sensor target resistance, and $R_{Lead}$ is the lead resistance for the velocity sensor $R_2$.

Having determined the desired resistance setpoint for $R_2$ and produced the control voltage with the DAC 404, the temperature control loop must be closed. This is accomplished with a periodic loop refresh cycle. This cycle, as shown in $\Phi_6$ of FIG. 5, begins by disabling the heating drive voltage produced by $Q_1$ by opening switch $S_1$. The current source I 401 is connected to the RTD $R_2$ by closing switch $S_2$.

After allowing the circuit to settle for a predetermined time, switch $S_3$ is closed so that the voltage produced on $R_2$ by current I is placed on the inverting (−) input of amplifier $A_1$. The error between this voltage and the target voltage produced by the DAC 404 causes the output of $A_1$ to change through an integration process with capacitor $C_1$, with $R_2$ being the integration source resistance. This in turn drives the gate of transistor $Q_1$ and changes the heating drive voltage impressed on the RTD $R_2$ during its heating cycle. In this way, after many refresh cycles, $R_2$ is forced to a temperature such that its resistance matches the computed target resistance.

There are several unique characteristics of this circuit. First, as in the circuit of FIG. 2, the temperature measurement and heating are separated into distinctly separate time phases. Second, the use of a single current source for resistance measurement makes the operation of the circuit independent of the current source, since the circuit depends only on the ratio of the ambient and velocity resistance measurements. Third, use of a single reference voltage makes measurement and control fully ratiometric, making these measurements independent of the absolute value of the reference voltage. Fourth, amplifier $A_1$ and $C_2$ form both an error amplifier and a sample-and-hold function.

Just as in the circuit of FIG. 2, the circuit of FIG. 4 provides a number of distinct advantages over the typical bridge control circuit. First, self-heating of the ambient temperature sensor $R_5$ is minimized by the design of the ambient sensor circuit values. In addition, selection of the differential temperature between the ambient temperature and the velocity sensor $R_2$ can be made under microprocessor control to optimize measurement of different velocity ranges.

It is also true for the circuit of FIG. 4 that lead wire resistance is automatically corrected by a separate dynamic lead resistance measurement. The circuit is also self-starting. The bridge circuit of the prior art requires additional components to ensure the circuit starts properly when first powered.

Furthermore, all measurements and control are relative to the reference voltage $V_{REF}$ and the reference resistor $R_1$ that has a known value. This makes all measurements ratiometric to known values, eliminating several sources of error found with other techniques. And, finally, selection of the velocity RTD resistance is not constrained by the ambient RTD resistance or type. In fact, a completely different ambient sensor may be used, such as (but not limited to) a semiconductor sensor or a thermocouple.

There has been described herein a thermal anemometer that offers distinct advantages when compared with the prior art. It will be apparent to those skilled in the art that modifications may be made without departing from the spirit and scope of the invention. For example, it should be noted that the two specific embodiments described above are representative of the concept, but the principle is not limited to these specific forms. Those skilled in the art will observe, for instance, that any heated element exhibiting a change in value with temperature change resulting from heating could be used. A thermistor is an example of one such single element, but the use of a controlled heating element and a separate but physically coupled temperature sensor could also be used. Additionally, the excitation used for the heating is not limited to an applied variable voltage. Again, those skilled in the art will recognize that a current source could be substituted for the voltage drive source. Any other mechanism can be used whereby the temperature of the velocity sensing element is controlled by changing the power dissipated in the sensor.

What is claimed is:

1. A thermal anemometer including:
   an ambient sensor;
   a velocity sensor;
   a sample and hold circuit;
   a switched heating voltage driver;
   a combined error amplifier and sample and hold circuit;
   a current source;
   a first switch electrically connected between said current source and said sample and hold circuit and between said current source and said ambient sensor;
   a second switch electrically connected between said current source and said switched heated voltage driver;
   a third switch electrically connected between said combined error amplifier and sample and hold circuit and between said combined error amplifier and sample and hold circuit and said velocity sensor; and
   said combined error amplifier and sample and hold circuit electrically connected between said sample and hold circuit and said switched voltage driver.

2. The thermal anemometer of claim 1, where said sample and hold circuit includes a switch and a capacitor.

3. The thermal anemometer of claim 2, wherein said voltage is removed across said velocity sensor and said current source is selectively connected to said ambient sensor.

4. The thermal anemometer of claim 3, where said current source is selectively connected to said velocity sensor.

5. The thermal anemometer of claim 3, wherein the ambient sensor includes a resistance, said resistance creating a voltage across the resistance when current from the current source is applied to the resistance, said voltage being equal to a voltage across the velocity sensor, when the same amount of current is applied to the velocity sensor.

6. The thermal anemometer of claim 1, where voltage is selectively applied across said velocity sensor.

7. The thermal anemometer of claim 1 where said sample and hold circuit obtains a voltage value of said ambient sensors and said combined error amplifier and sample and hold circuit obtains a voltage value from said velocity sensor.

8. A method of operating a thermal anemometer including:
   providing a current source;
   selectively applying current to an ambient sensor;
   measuring the voltage produced across the ambient sensor by the current;
   selectively applying current to a velocity sensor;
   measuring the voltage produced across the velocity sensor;
   comparing the voltage produced across the velocity sensor with the voltage across the ambient sensor to obtain a compared voltage; and
   providing a voltage source selectively connected to said velocity sensor, and adjusting the voltage in response to the compared voltage.

9. The method of claim 8, further including storing the value of the measured voltage across the velocity sensor and storing the value of the measured voltage across the ambient sensor.

10. The method of claim 9, further including, providing a third switch, said third switch interposed between said voltage source and said velocity sensor, said third switch being open when said first switch is closed.

11. The method of claim 8 further including:
    removing the current source from the velocity sensor;
    storing the value of the voltage across the ambient sensor;
    removing the current source from the ambient sensor;
    applying the current source to the velocity sensor; and
    storing the value of the voltage across the voltage sensor.

12. The method of claim 8 further including:
    providing a first switch to selectively apply current to the ambient sensor, opening said first switch when applying current to said velocity sensor;
    providing a second switch to selectively apply current to the velocity sensor, opening said second switch when applying current to said ambient sensor.

13. The method of claim 8, wherein the current applied to the ambient sensor and the current applied to the velocity sensor come from the same current source.

14. A method of operating a thermal anemometer including:
    providing a current source;
    selectively applying current from the current source to an ambient sensor, thereby producing a voltage across the sensor;
    selectively applying current from the current source to a velocity sensor, thereby producing a voltage across the sensor; new line selectively applying a voltage from a voltage source across the velocity sensor;
    providing a digital to analog converter to measure the voltage produced across the ambient sensor and the velocity sensor; and
    providing a microprocessor to process the voltage values and determine ambient temperature and desired velocity sensor temperature.

15. The method of claim 14, further including providing a reference resistance, and selectively applying current from the current source to produce a voltage across the reference resistance.

16. The method of claim 15, further including providing the microprocessor with the voltage across the reference resistance.

17. A method of controlling the temperature of a velocity sensing element in a thermal anemometer, including:
    providing a velocity sensor selectively electrically connected to a power source;
    providing an ambient sensor selectively electrically connected to a power source;
    obtaining the voltage across the ambient sensor;
    obtaining the voltage across the velocity sensor;

comparing the voltage across the ambient sensor with the voltage across the velocity sensor; and changing the power dissipated in the velocity sensor in response to the value obtained by comparing the voltage across the sensors.

18. The method of claim 17, further including providing a microprocessor to compare the voltages across the sensors.

19. The method of claim 18 further including:
providing a reference voltage to said microprocessor;
providing a reference resistance; and
determining the velocity sensor resistance from the measured voltages and the reference resistance.

* * * * *